United States Patent
Vanover et al.

(10) Patent No.: US 12,410,726 B1
(45) Date of Patent: Sep. 9, 2025

(54) TURBINE ENGINE CENTERBODY GENERATOR

(71) Applicant: RTX Corporation, Farmington, CT (US)

(72) Inventors: Adam David Vanover, Moodus, CT (US); Nicholas J. Lawliss, Santa Cruz, CA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/734,786

(22) Filed: Jun. 5, 2024

(51) Int. Cl.
*F01D 15/10* (2006.01)
*F02C 7/32* (2006.01)

(52) U.S. Cl.
CPC ............... *F01D 15/10* (2013.01); *F02C 7/32* (2013.01); *F05D 2220/76* (2013.01); *F05D 2230/60* (2013.01)

(58) Field of Classification Search
CPC .. F01D 15/10; F05D 2220/76; F05D 2230/60; F02C 7/32
See application file for complete search history.

(56) References Cited

U.S. PATENT DOCUMENTS

| | | | |
|---|---|---|---|
| 9,410,431 | B2 | 8/2016 | Bottome et al. |
| 9,759,129 | B2 | 9/2017 | Lindsey et al. |
| 9,915,164 | B2 | 3/2018 | Roberge |
| 9,969,489 | B2 | 5/2018 | Roby et al. |
| 10,605,165 | B2 | 3/2020 | Abe et al. |
| 2016/0195015 | A1 | 7/2016 | Little |
| 2018/0171932 | A1* | 6/2018 | De Sousa ............... F02K 1/386 |
| 2018/0202359 | A1* | 7/2018 | Bifulco ..................... F02C 7/04 |
| 2020/0003157 | A1* | 1/2020 | Clements ................ F01D 5/225 |
| 2020/0182158 | A1* | 6/2020 | Kupratis ................. F02C 3/113 |
| 2021/0355893 | A1* | 11/2021 | Frantz .................. B64D 27/026 |
| 2022/0056810 | A1* | 2/2022 | Grunwald ............... F01D 15/10 |
| 2022/0275730 | A1* | 9/2022 | Holleran ................. F01D 5/282 |
| 2024/0322646 | A1* | 9/2024 | Molnar, Jr. .......... H02K 7/1823 |

OTHER PUBLICATIONS

Richard R. Secunde, "Integrated Engine-Generator for Aircraft Secondary Power", Nov. 1, 1972, NASA Technical Memorandum X-68139, National Aeronautics and Space Administration, presented at 8th Joint Propulsion Specialist Conference, American Institute of Aeronautics and Astronautics, New Orleans, Louisiana.

* cited by examiner

*Primary Examiner* — Thomas P Burke
(74) *Attorney, Agent, or Firm* — Bachman & LaPointe, P.C.

(57) ABSTRACT

A gas turbine engine has: a compressor; a combustor; a turbine; a generator in a centerbody and coupled to the turbine; a case; a plurality of struts mounting the centerbody to the case; and wiring passing through at least one of the struts to the generator. The centerbody has: a first member having a forward rim and at least one recess extending aft from an opening at the forward rim, the wiring passing through the recess; at least a second member blocking the opening; and a threaded fastener securing the strut to the second member.

17 Claims, 7 Drawing Sheets

TURBINE ENGINE CENTERBODY GENERATOR

BACKGROUND

The disclosure relates to gas turbine engines. More particularly, the disclosure relates to a centerbody generator.

Gas turbine engines (used in propulsion and power applications and broadly inclusive of turbojets, turboprops, turbofans, turboshafts, industrial gas turbines, and the like) include generators.

An example engine is a multi-spool engine such as a two-spool engine. A two-spool engine will have a high speed/pressure spool and a low speed/pressure spool. In an example wherein each spool has a compressor section and a turbine section, the gaspath passes sequentially through the low speed/pressure compressor (LPC) section, the high speed/pressure compressor (HPC) section, the combustor (e.g., annular or can-type), the high speed/pressure turbine (HPT) section, and the low speed/pressure turbine (LPT) section. In an example two-spool turbofan engine, the fan is upstream/forward of the LPC and is directly powered by the low spool. The HPT drives rotation of the HPC and the LPT drives rotation of the LPC and fan. In alternative turbofan embodiments, there may be no separate LPC with the LPT driving only the fan. In other embodiments, a reduction transmission (e.g., epicyclic) may intervene between the low spool and the fan to drive the fan with a gear reduction relative to the LPT and thus allow a larger diameter fan than might otherwise be achieved.

In such multi-spool engines, a generator is often run off the high spool with a gear on the high spool driving a shaft passing radially outward to a generator and/or other accessories typically mounted near the bottom of the engine well offset from the engine centerline.

Despite the prevalence of such offset generators, coaxial generators mounted to one of the spools have been proposed. U.S. Pat. No. 10,605,165, "Aircraft Engine Apparatus" of Abe et al., Mar. 31, 2020 discloses a generator mounted in a nose cone of a turbofan engine.

SUMMARY

One aspect of the disclosure involves a gas turbine engine comprising: a compressor; a combustor; a turbine; a generator in a centerbody and coupled to the turbine; a case; a plurality of struts mounting the centerbody to the case; and wiring passing through at least one of the struts to the generator. The centerbody comprises: a first member having a forward rim and at least one recess extending aft from an opening at the forward rim, the wiring passing through the recess; at least a second member blocking the opening; and a threaded fastener securing the strut to the second member.

In a further embodiment of any of the foregoing embodiments, additionally and/or alternatively, the centerbody further comprises a third member wherein: the third member has an external thread mated to an internal thread of the first member; and the threaded fastener locks the third member against unthreading rotation.

In a further embodiment of any of the foregoing embodiments, additionally and/or alternatively, the threaded fastener is in threaded engagement with a hole in the second member and passes through unthreaded holes in the strut and third member so as to lock the third member against unthreading rotation.

A further embodiment of any of the foregoing embodiments additionally and/or alternatively, the third member is a nose cone.

In a further embodiment of any of the foregoing embodiments, additionally and/or alternatively, the second member has a pair of projections extending into the opening at opposite circumferential sides thereof.

A further embodiment of any of the foregoing embodiments may additionally and/or alternatively include a fan having a fan hub wherein: a drive hub couples a rotor of the generator to the fan hub; and the fan hub couples the drive hub to the turbine.

In a further embodiment of any of the foregoing embodiments, additionally and/or alternatively, the fan is driven by the turbine without reduction.

In a further embodiment of any of the foregoing embodiments, additionally and/or alternatively, the turbine is a low-speed turbine section and the engine includes a high speed turbine section upstream of the low speed turbine section along a gaspath.

A further embodiment of any of the foregoing embodiments may additionally and/or alternatively include a second generator coupled to the turbine.

In a further embodiment of any of the foregoing embodiments, additionally and/or alternatively, the turbine comprises a higher pressure turbine and a lower pressure turbine, the lower pressure turbine downstream of the higher pressure turbine along a gaspath; the second generator is coupled to the higher pressure turbine; and the generator is coupled to the lower pressure turbine.

In a further embodiment of any of the foregoing embodiments, additionally and/or alternatively, the second generator is coupled to the turbine via a radially-extending shaft.

A further aspect of the disclosure involves a method for manufacturing the gas turbine engine. The method comprises: inserting the generator into the first member; mating the second member to the first member; threading a third member to the first member to axially retain the second member to the first member; and installing the threaded fastener to secure the strut to the second member and lock the third member against unthreading rotation.

In a further embodiment of any of the foregoing embodiments, additionally and/or alternatively, the mating causes protrusions on the second member to mate with the first member to secure the second member to the first member against rotation.

A further aspect of the disclosure involves a method for using the gas turbine engine. The method comprises: running the engine so that the turbine drives a fan having a fan hub; and the fan hub driving the generator.

A further aspect of the disclosure involves, a gas turbine engine comprising: a compressor; a combustor; a turbine; a generator in a centerbody and coupled to the turbine; a case; a plurality of struts mounting the centerbody to the case; and wiring passing through at least one of the struts to the generator. The centerbody comprises means for receiving the generator with the wiring attached while limiting folding/bending the wiring.

In a further embodiment of any of the foregoing embodiments, additionally and/or alternatively, the means comprises: a first member having a rim and at least one recess extending from an opening at the rim, the wiring passing through the recess; and at least a second member blocking the opening.

In a further embodiment of any of the foregoing embodiments, additionally and/or alternatively, the struts are secured to both the first member and the second member.

A further aspect of the disclosure involves a method for assembling a centerbody, the method comprising: inserting a generator into a first section of the centerbody; mating a ring to a forward end of the first section; threading a nose cone to the first section to axially retain the ring to the first section; and installing a threaded fastener to secure a strut to the ring and lock the nosecone against unthreading rotation.

A further embodiment of any of the foregoing embodiments may additionally and/or alternatively include coupling a rotor of the generator to a fan hub for driving the rotor.

In a further embodiment of any of the foregoing embodiments, additionally and/or alternatively: the engine has at least three said struts and the installing is of a respective a threaded fastener to secure each said strut to the ring and lock the nosecone against unthreading rotation; and for at least one of the struts, radially inserting the strut through a case so as to receive wiring from the generator.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
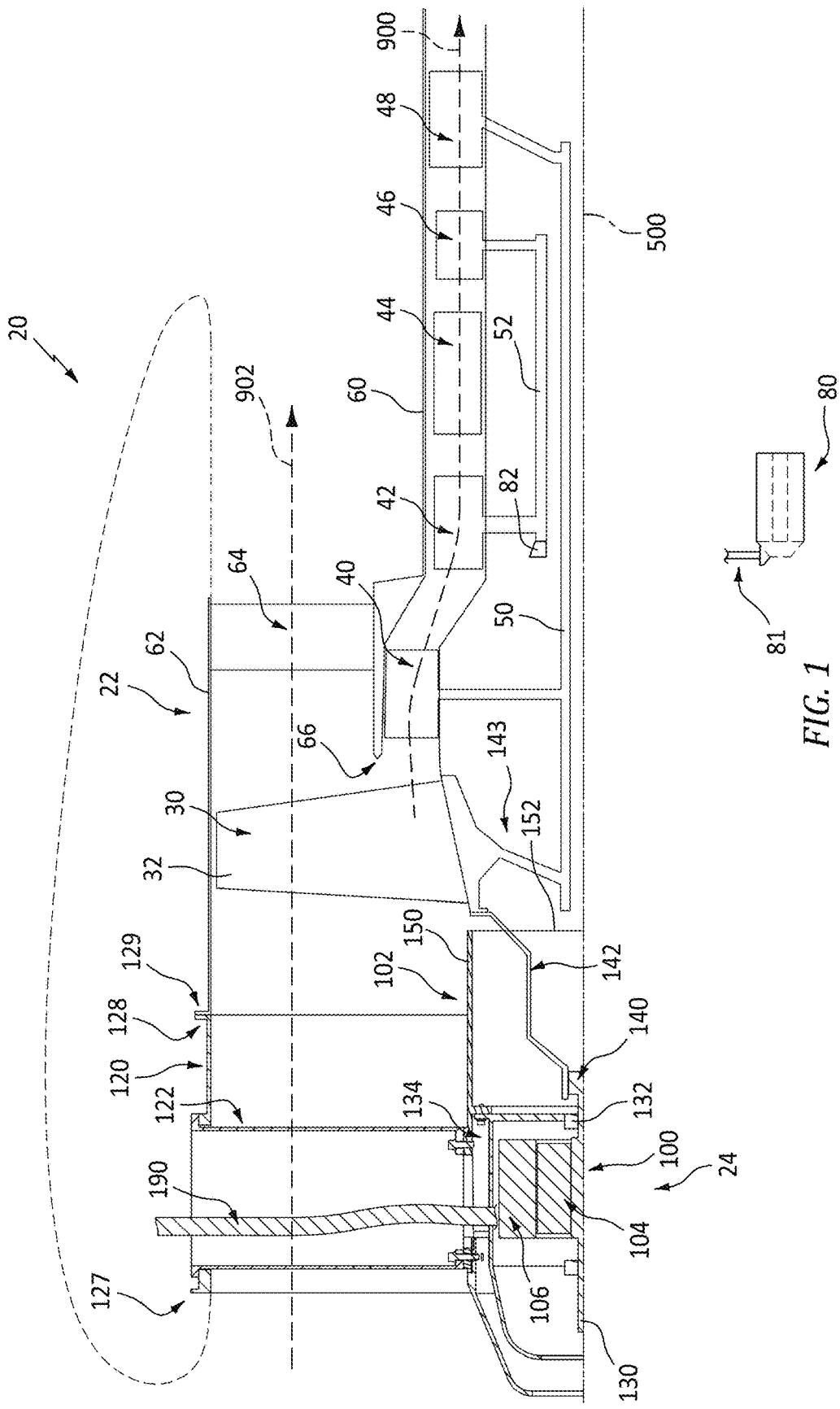
FIG. 1 is a schematic half sectional view of a turbine engine with centerbody/nose cone generator.
Figure 3:
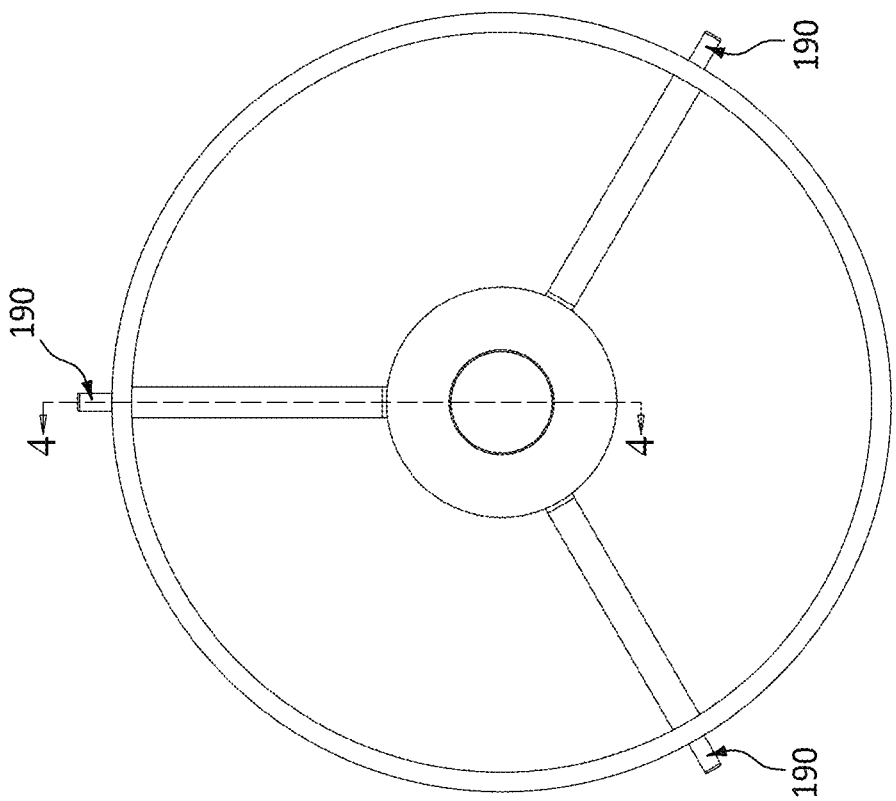
FIG. 3 is a front view of the auxiliary generator section.
Figure 2:
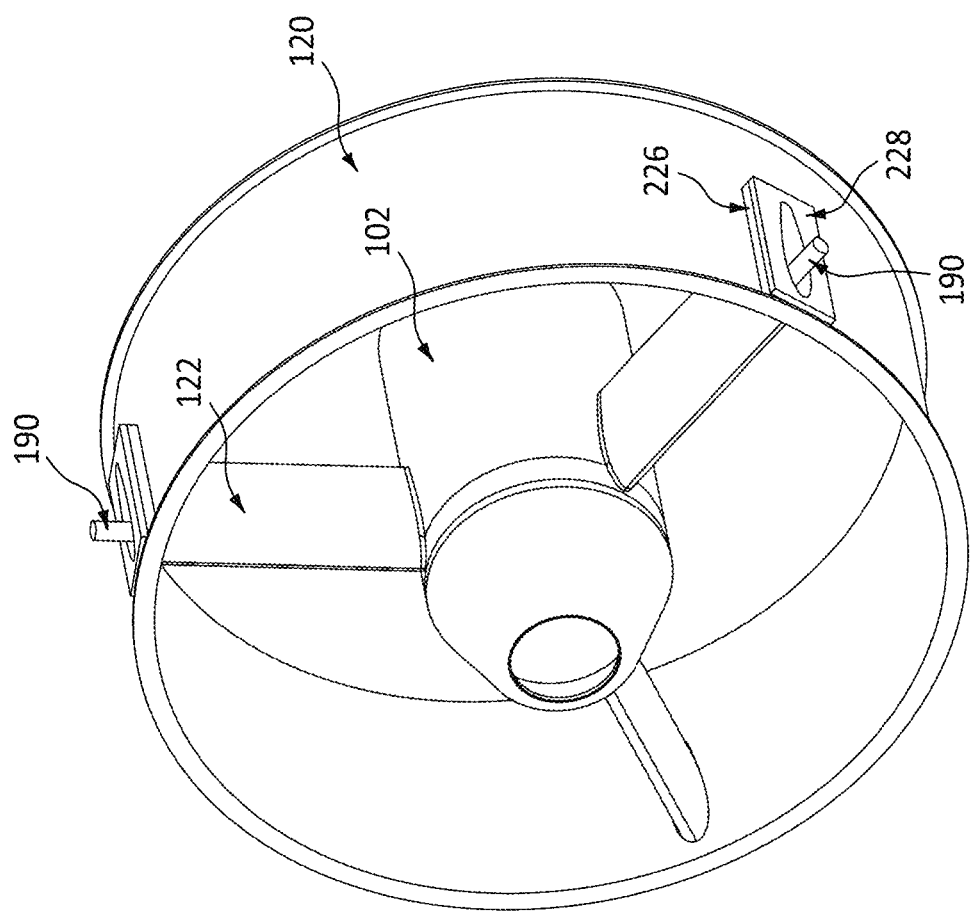
FIG. 2 is a view of an auxiliary generator section of the engine.

FIG. 1 shows a gas turbine engine 20 including a main engine section 22 and an accessory generator section 24. The example main engine section 22 is shown as a two-spool turbofan having, sequentially along a gaspath 900, from upstream to downstream, a fan section 30 having a circumferential array of fan blades 32, a low pressure compressor (LPC) section 40, a high pressure compressor (HPC) section 42, a combustor section 44, a high pressure turbine (HPT) section 46, and a low pressure turbine (LPT) section 48. Each of the LPC, HPC, HPT, and LPT includes one or more stages of blades interspersed with one or more stages of vanes. The blades of the respective sections are coupled to a respective high speed shaft 52 or low speed shaft 50. The shafts are supported to each other and/or static case structure 60 via one or more bearing systems (not shown) to allow each of the low spool and high spool to rotate about an engine centerline or central longitudinal axis 500.

In the example, the fan 30 is co-spooled on the low spool so as to be directly driven by the low shaft 50. In alternative embodiments, a transmission (not shown, e.g., epicyclic) may intervene so as to drive the fan with a gear reduction. Yet alternative embodiments involve other configurations of one or more spools. The example fan blades are surrounded by a fan case 62 supported relative to the core case 60 via a circumferential array of struts 64 across a bypass flowpath 902 diverging from the core flowpath 900 at a splitter 66.

As discussed further below, it may be desirable to incorporate a generator 100 into a centerbody structure 102. The generator rotor 104 may be coaxial with and driven by one of the engine spools to rotate relative to a generator stator 106. Depending upon implementation, this generator 100 may replace or augment an existing offset (e.g., driven via a tower shaft and gear system) generator 80 (FIG. 1). In one group of examples, there may be a requirement for power generation beyond what is offered by a baseline HPT-driven offset generator 80 (driven via a tower shaft 81 from a gear 82 on the high speed shaft). This may be in a situation wherein packaging does not allow any substantial increase in the size of the baseline offset generator. Or the HPT may be insufficient to power the increased load.

In one group of such examples discussed below, the normal nose cone/spinner of a turbofan engine is removed and replaced with a stationary centerbody 102 containing the added generator 100. The generator rotor 104 is mechanically secured relative to the fan to be driven by the same turbine section driving the fan (e.g., the LPT in the multi-spool example). To hold the centerbody 102 stationary (against rotation), the centerbody may be supported relative to a case structure 120 (e.g., a case ring insert/extension discussed below) via a number of radial struts 122 extending across the now-extended inlet flowpath leg (upstream of the core v. bypass split).

For example, for a wing nacelle turbofan engine, the leading inlet cowl ring structure of the baseline engine nacelle (fan case nacelle) may be removed and a case ring insert/extension 120 (bearing the struts 122 supporting the added centerbody 102) may be mounted to the forward end of the existing fan case structure 62. For example, the case ring insert 120 may have, at an aft rim, mounting features 128 complementary to the existing forward rim mounting features 129 of the fan case (which had been used to mount the inlet cowl). In a simple implementation, these may merely be a bolt circle or other arrangement (e.g., with associated mounting ears on each of the case ring insert and fan case for receiving threaded fasteners). A replacement inlet cowl may mount to the case ring insert to slightly extend the fan case/nacelle. In one example, the forward rim of the case ring insert 120 may have mounting features 127 identical to those 129 of the forward rim of the fan case structure to mount the re-used or a new replacement inlet cowl. If the inlet cowl is re-used, an outer diameter cowl insert would bridge aft therefrom to the remaining existing cowl structure. FIG. 1 shows an overall final cowl outline in broken line.

Figure 4:
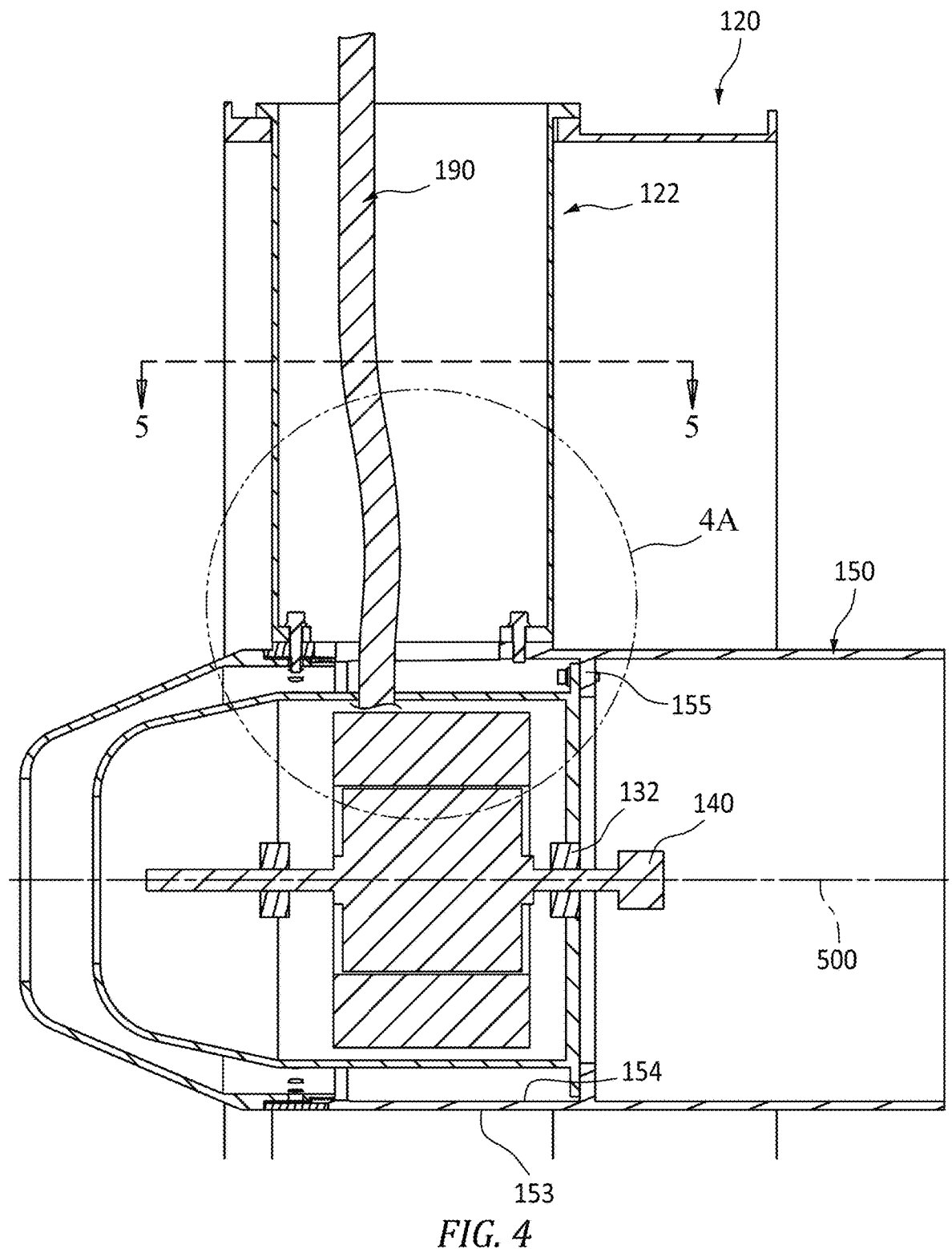
FIG. 4 is a transverse sectional view of the auxiliary generator section taken along line 4-4 of FIG. 3.
Figure 4A:
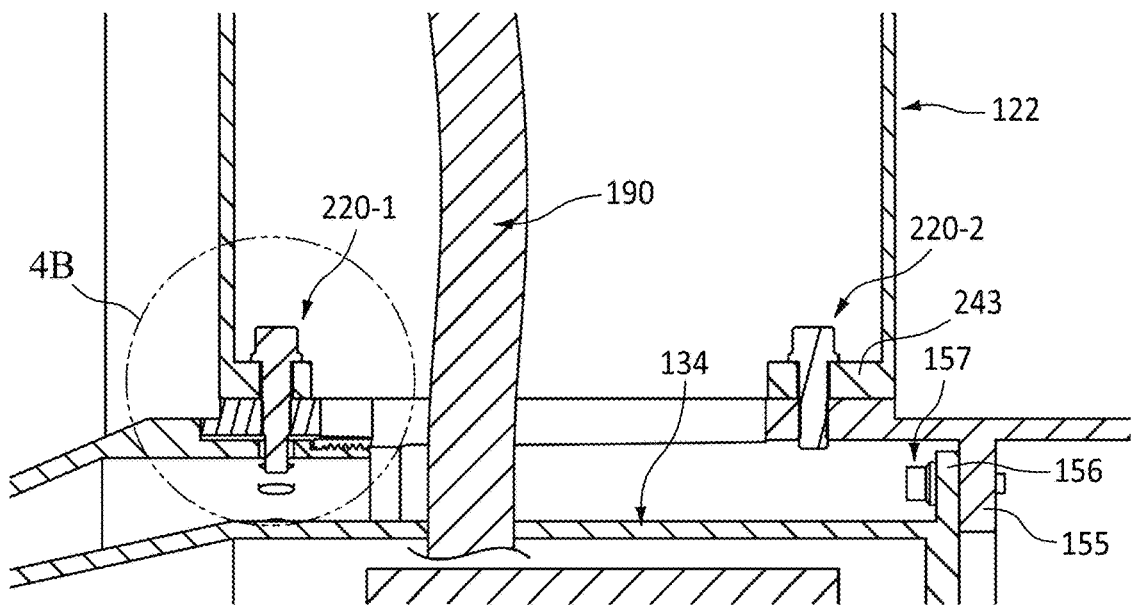
FIG. 4A is an enlarged view of strut mounting.
Figure 4B:
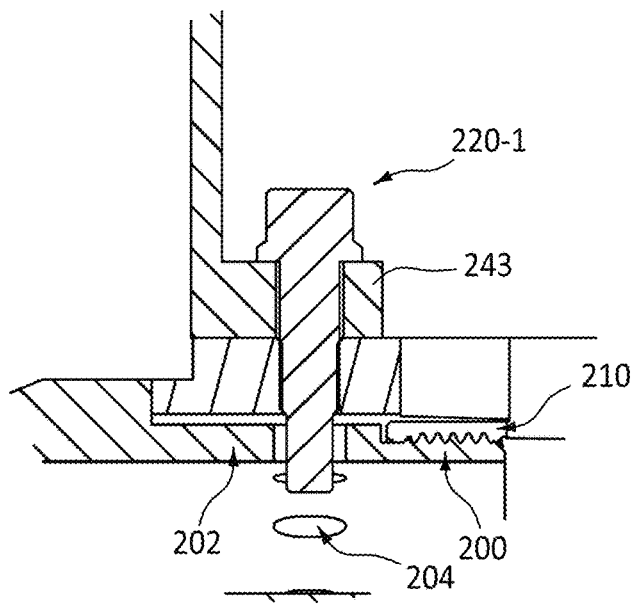
FIG. 4B is a further enlarged view of strut mounting.
Figure 5:
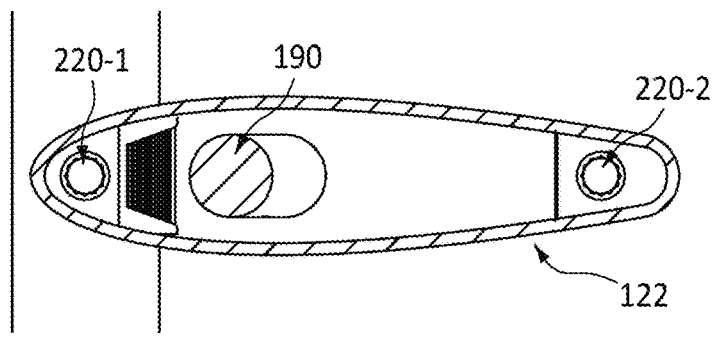
FIG. 5 is a transverse sectional view of a strut taken along line 5-5 of FIG. 4.
Figure 7:
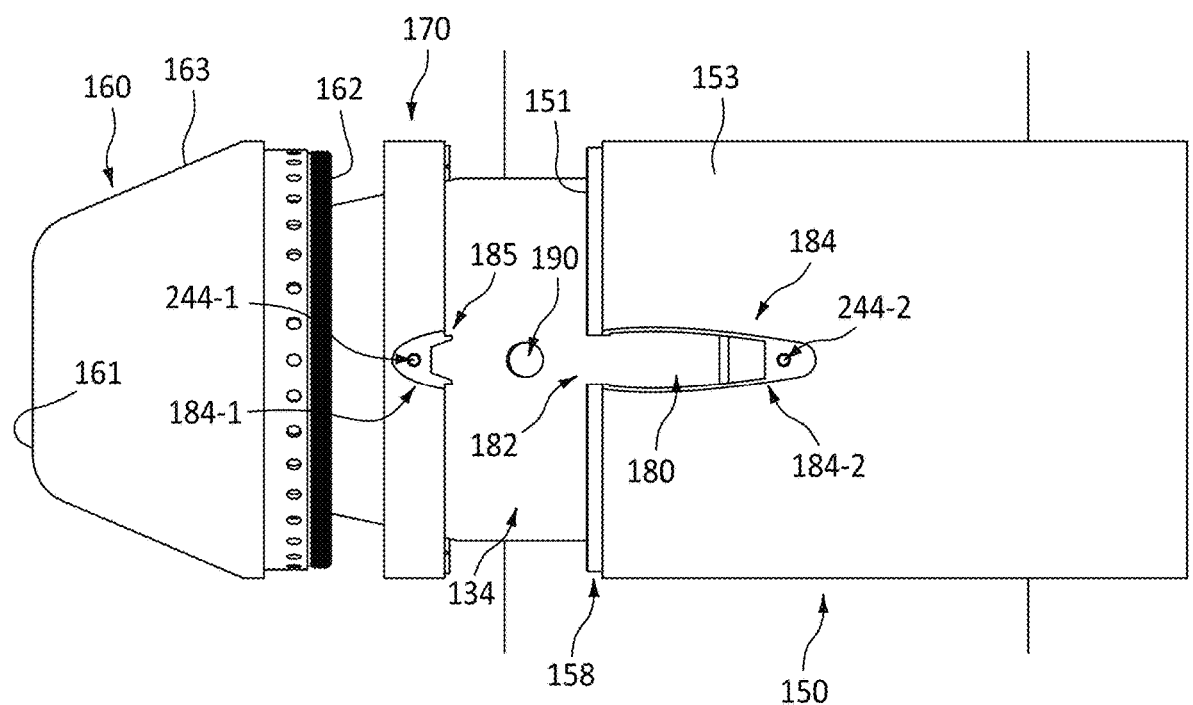
FIG. 7 is an inward radial view of the centerbody of the auxiliary generator section of FIG. 6.
Figure 9:
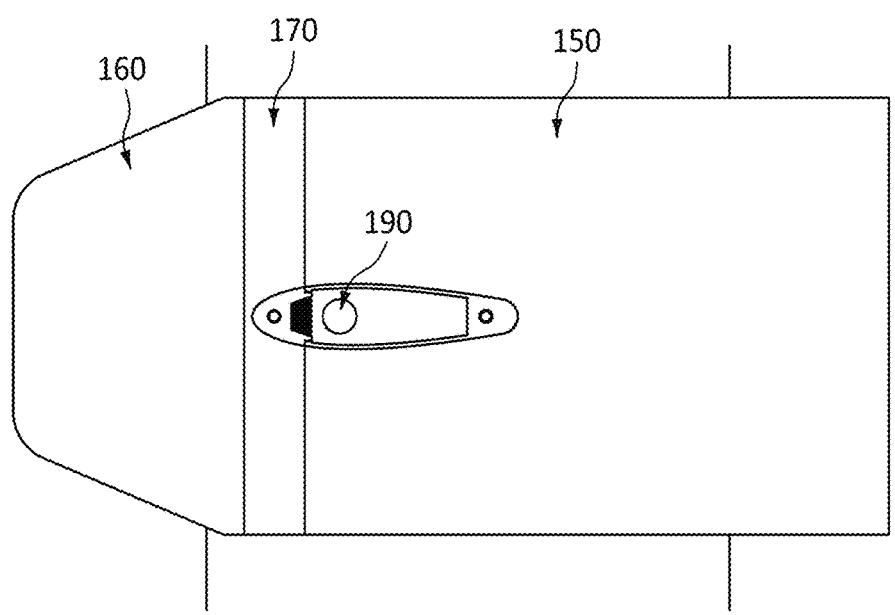
FIG. 9 is an inward radial view of the centerbody of the auxiliary generator section of FIG. 8.

In the example, the generator rotor 104 is supported via a shaft 130 supported by bearings 132 for rotation about the engine centerline 500 relative to the stator 106. In the particular example, the generator bearings mount to a generator case structure/housing assembly 134 (although schematically shown as a single piece). The example forward bearing 132 may be supported via a spider structure (not shown) so as to expose the rotor and stator to cooling air. A rear input end section 140 of the shaft 130 may bear features such as splines for engaging complementary features of a forward end of a drive hub 142 whose aft end is mounted to the baseline fan hub 143 (e.g., via the same or similar bolt circle of fasteners (not shown or other features) that were used to mount the baseline nose cone to the fan hub). The drive hub 142 is largely within an aft section of a main housing piece 150 of the centerbody extending to an aft rim 152 spaced slightly forward of the fan hub to allow relative differential rotation as the fan rotates. As is discussed further below, the main piece 150 extends aft from a forward rim 151 (FIG. 7). The centerbody housing also includes a nose cone piece 160 and an intermediate piece 170. The main piece 150 (FIG. 4) has an outer diameter (OD) surface 153 and an inner diameter (ID) surface 154. At an intermediate location along its length, the main piece 150 includes a radially inwardly extending mounting flange or mounting ears 155 (FIG. 4A) for mounting the generator (e.g., via fasteners 157 through an external flange or mounting ears 156 of the generator housing 134).

The diametric size of the generator stator relative to that of the centerbody is an important consideration. In general, aerodynamic efficiency, packaging efficiency, and weight favor a small diameter centerbody. However, generator capacity may favor a radially large generator. Minimizing radial clearance between the generator stator and the centerbody inner diameter (ID) surface is thus desirable. Control/monitoring wiring and/or power wiring influence packaging considerations. Inserting the generator through a rim of a centerbody housing section during installation presents issues of potentially bending the wiring in order to then feed the wiring outward through apertures in the centerbody (which apertures will subsequently be surrounded by struts) to pass the wiring radially outward. Thus, the available bend radius of the wiring imposes a radial clearance requirement that means the stator outer diameter would be otherwise excessively smaller than the housing inner diameter.

By making one or more apertures 180 in that centerbody main housing piece 150 open to the forward rim 151, the generator may be installed without the need to bend the wiring. Thus, with wiring protruding radially from the stator, the stator may pass into the main housing piece 150 with little generator-to-centerbody radial clearance and the wiring passing through the opening of the aperture(s) in the forward rim. This may allow very close radial accommodation between the generator outer diameter (OD) surface and the centerbody section inner diameter (ID) surface. Those open apertures may then be closed off by one or more other centerbody housing pieces. FIG. 7 shows such an aperture 180 having an open end 182 at the forward rim 151. The aperture 180 is formed at a strut mounting feature 184 (shown as a protruding mounting boss with footprint generally similar to the strut footprint). FIG. 7 also shows the wiring harness 190 about to pass into the aperture 180 opening 182.

After the generator has been installed, it may be secured in place. Depending upon implementation, this may involve inserting fasteners from the rear or the front. In the illustrated example, screws 157 (FIG. 6) are inserted through the front to pass through unthreaded holes in the flange or ears 156 and to engage threaded holes in the flange 155. After the generator is secured in place, the intermediate piece 170 may be installed. The example intermediate piece 170 has a forward rim 171, an aft rim 172, an outer diameter (OD) surface 173, and an inner diameter (ID) surface 174. To close off the aperture 180, the intermediate piece 170 includes a protruding boss feature 184-1 (FIG. 7) complementary to a boss feature 184-2 of the main piece 150 for forming the strut mounting feature 184. The boss feature 184-1 has a pair of rearwardly protruding projections 185 received in the aperture 180 to angularly register the pieces 170 and 150 with each other. The example main piece 150 has, at its forward rim 151, a radially inwardly recessed shoulder 158 dimensioned to be received within an aft portion of the intermediate piece 170 in close or contacting radial proximity.

Figure 6:
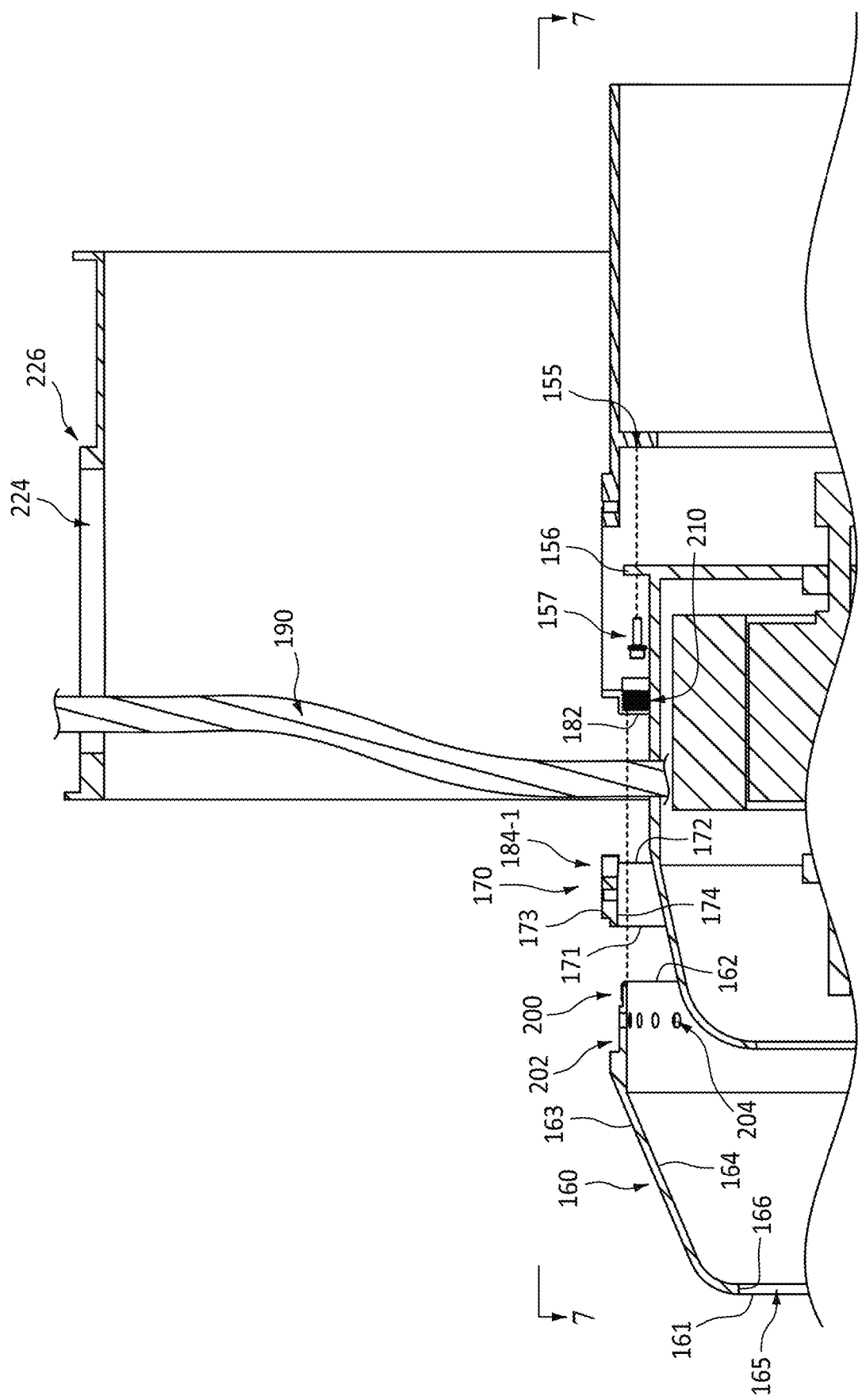
FIG. 6 is a view of the auxiliary generator section along the FIG. 4 cut plane during a first intermediate stage of assembly.

The example nose cone piece 160 has a forward end 161, an aft rim 162, an OD surface 163, and an ID surface 164 (FIG. 6). The example nose cone piece has a central venting opening 165 at a rim 166. An aft portion of the nose piece near the aft rim 162 is stepped radially inward with an externally threaded rear section 200 and a section 202 forward thereof having a circumferential array of holes 204. After assembly of the intermediate piece 170 to the main piece 150, the nose cone piece 160 may be inserted and rotated to thread into place. The threading engagement is with an internally threaded section 210 of the main piece 150 near the rim 182.

Figure 8:
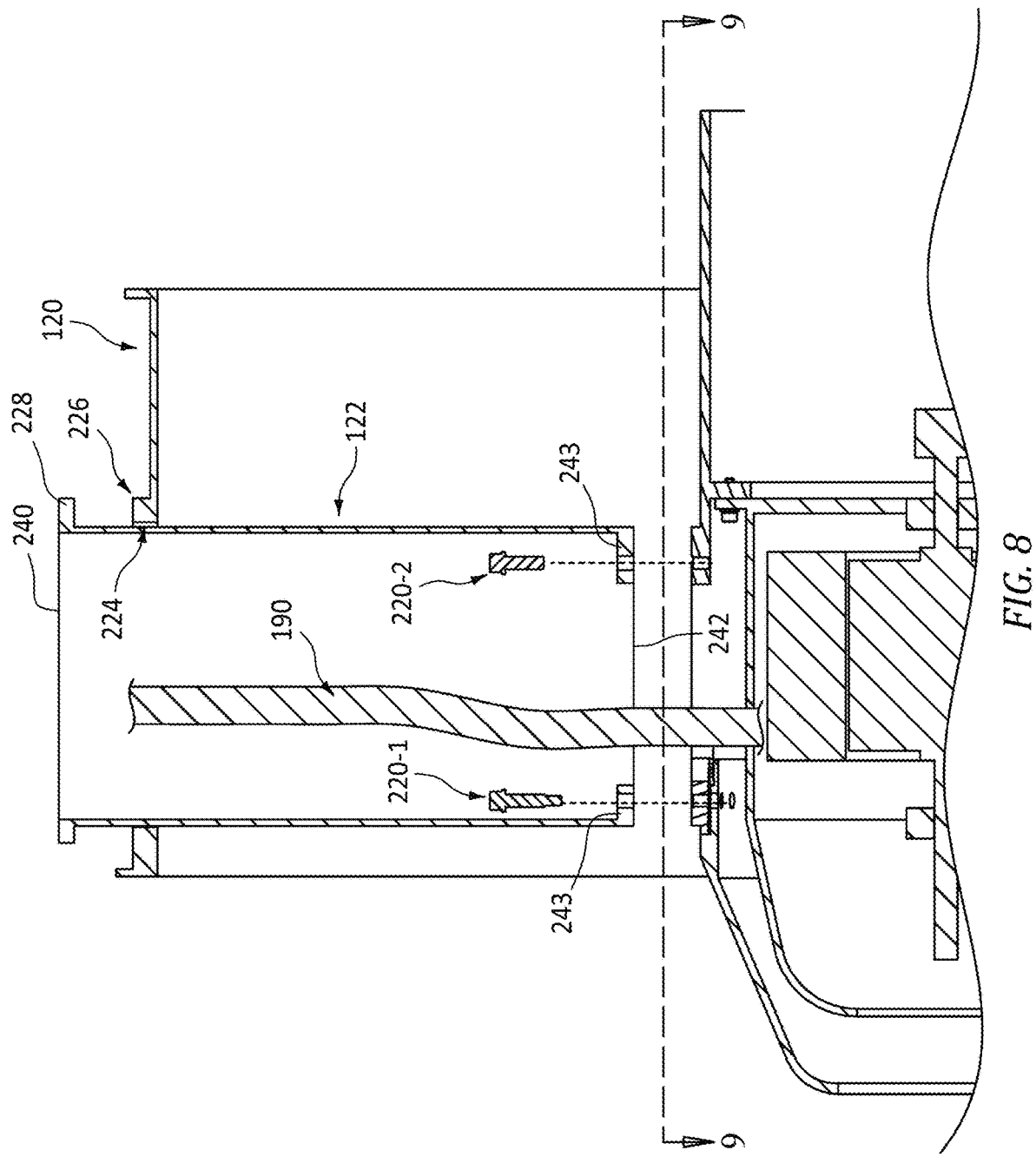
FIG. 8 is a view of the auxiliary generator section along the FIG. 4 cut plane during a second intermediate stage of assembly.

As is discussed further below, retention of the nose cone piece 160 against unthreading is provided by an example forward one 220-1 (FIG. 4A) of two fasteners 220-1, 220-2 used to mount each strut to the centerbody housing assembly. FIG. 8 shows, after assembling the centerbody and placing the case 120 in position, each of the struts 122 may be radially inwardly inserted through an aperture 224 in the case 120 (e.g., surrounded by a boss 226). This may be preceded by feeding the wiring through the associated aperture in the case. The radial clearance between case and centerbody means only slight bending of the wiring is needed. For example bending radius may be not less than an example ten multiples of the wire/bundle diameter or an example not less than six times or not less than four times) Example wire/bundle diameters are 3.0 millimeters to 30.0 millimeters or 8.0 millimeters to 25.0 millimeters. The example strut, at its outer diameter end 240 has an outwardly protruding flange 228 which contacts the apertured boss 226 on the case 120. During strut installation, the inward radial end (ID end) 242 of the strut has an opening passing the wiring 190 (ultimately out an opening at the OD end 240. At the ID end 242, the strut has respective fore and aft apertured interior mounting flanges 243 for passing the screws 220-1 and 220-2, respectively. To receive these screws, the boss section 184-2 has a threaded aperture 244-2 (FIG. 7) so that the screw 220-2 passes freely through the strut aft mounting aperture to thread into that threaded. boss mounting aperture. In this example, the intermediate piece boss section 184-1 also has a threaded aperture 244-1. However, the screw 220-1 is longer than the screw 220-2 having a narrowed unthreaded tip portion capable of protruding well past the ID surface 174 of the intermediate piece and into a locally adjacent one of the nose cone holes 204. The receipt in such hole 204 secures the nose cone against rotation (e.g., unthreading rotation). The fasteners 220-1 and 220-2 may be tightened via a socket wrench using an extension extending radially through the strut from the OD end thereof.

In the illustrated example, all three of the struts 122 pass associated wiring. However, this need not be the case. As few as one strut may pass such wiring. The other struts and their mounting features may be otherwise the same as the one passing wiring. Optionally, one or more of the struts may additionally or alternatively pass some other utility such as a cooling and/or lubricating liquid. Optionally, if a strut is not passing wiring, fluid, etc., its interior may be closed off such as by a cover plate (not shown).

In use, the generator 100 may replace, supplement, or complement the generator 80 (when both are present). For example, in certain aircraft with added loads over a baseline aircraft, the generator 100 may exclusively or principally power such added loads. This may be relevant, for example, to aircraft with updated or added avionics (e.g., including sensors, communications hardware, and the like) or other added loads. In replacement situations, there may not be enough space to provide a large enough generator 80 to power all loads but there may be enough space for a generator 100 large enough to do so. This replacement is more likely in a new engine build situation than in a retrofit. A given basic engine may be used in diverse applications with diverse electrical power requirements. Thus, the generator 100 may be selected to meet the power requirements for any particular vehicle that uses a given engine. The form of generator 100 may be selected based upon the type of load. On example for many loads is a synchronous AC generator. There may be additional power regulation, conversion (step-up or step-down or AC-DC or DC-AC), and/or storage (e.g., batteries/or capacitors) equipment (not shown).

Component materials and manufacture techniques and assembly techniques may be otherwise conventional. Additionally, example materials for the housing pieces 150, 160, 170 are alloys such as steel or aluminum alloys or titanium alloys and example manufacture techniques are machining and/or additive manufacture. Example materials and manufacture techniques for the struts 122 are likewise. Example materials and manufacture techniques for the case 120 are likewise, but weldments start to become viable. And, theoretically, composites are also possibilities for all of the foregoing.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline engine or aircraft configuration, details of such baseline may influence details of particular implementations. Accordingly, other embodiments are within the scope of the following claims.

What is claimed is:

1. A gas turbine engine comprising:
a compressor;
a combustor;
a turbine;
a generator in a centerbody and coupled to the turbine;
a case;
a plurality of struts mounting the centerbody to the case; and
wiring passing through at least one of the struts to the generator,
wherein:
the centerbody comprises:
a first member having a forward rim and at least one recess extending aft from an opening at the forward rim, the wiring passing through the at least one recess;
at least a second member in contact with the first member such that the opening is blocked;
a third member; and
a threaded fastener securing the strut to the second member,
wherein:
the third member has an external thread mated to an internal thread of the first member;
the threaded fastener locks the third member against unthreading rotation; and
the threaded fastener is in threaded engagement with a hole in the second member and passes through unthreaded holes in the at least one strut and the third member so as to lock the third member against unthreading rotation.

2. The gas turbine engine of claim 1 wherein:
the wiring passes through all struts of the plurality of struts.

3. The gas turbine engine of claim 2 wherein:
the plurality of struts is three struts.

4. The gas turbine engine of claim 1 wherein:
the third member is a nose cone.

5. The gas turbine engine of claim 1 wherein:
the second member has a pair of projections extending into the opening at opposite circumferential sides thereof.

6. The gas turbine engine of claim 1 further comprising a fan having a fan hub wherein:
a drive hub couples a rotor of the generator to the fan hub; and
the fan hub couples the drive hub to the turbine.

7. The gas turbine engine of claim 6 wherein:
the fan is driven by the turbine without reduction.

8. The gas turbine engine of claim 7 wherein:
the turbine is a low-speed turbine section and the gas turbine engine includes a high-speed turbine section upstream of the low-speed turbine section along a gas path.

9. The gas turbine engine of claim 1 further comprising:
a second generator coupled to the turbine.

10. The gas turbine engine of claim 9 wherein:
the turbine comprises a higher pressure turbine and a lower pressure turbine, the lower pressure turbine downstream of the higher pressure turbine along a gas-path;
the second generator is coupled to the higher pressure turbine; and
the generator is coupled to the lower pressure turbine.

11. The gas turbine engine of claim 9 wherein:
the second generator is coupled to the turbine via a radially-extending shaft.

12. A method for manufacturing the gas turbine engine of claim 1, the method comprising:
inserting the generator into the first member;
mating the second member to the first member;
threading the third member to the first member to axially retain the second member to the first member; and
installing the threaded fastener to secure the strut to the second member and lock the third member against unthreading rotation.

13. The method of claim 12 wherein:
the mating causes protrusions on the second member to mate with the first member to secure the second member to the first member against rotation.

14. A method for using the gas turbine engine of claim 1, the method comprising:
running the gas turbine engine so that the turbine drives a fan having a fan hub; and
the fan hub driving the generator.

15. The method of claim 14, wherein the gas turbine engine further comprises:
a second generator coupled to the turbine.

16. The method of claim 15 wherein:
the turbine comprises a higher pressure turbine and a lower pressure turbine, the lower pressure turbine downstream of the higher pressure turbine along a gas-path;
the second generator is coupled to the higher pressure turbine; and
the generator is coupled to the lower pressure turbine.

17. The method of claim 16 wherein:
the second generator is coupled to the turbine via a radially-extending shaft.

* * * * *